US012736611B2

(12) United States Patent
Bourdoux et al.

(10) Patent No.: US 12,736,611 B2
(45) Date of Patent: Sep. 15, 2026

(54) RADIO DEVICE FOR WIRELESS COMMUNICATION AND RADAR SENSING

(71) Applicant: IMEC VZW, Leuven (BE)

(72) Inventors: Andre Bourdoux, Theux (BE); Pierre Wambacq, Groot-Bijgaarden (BE); Giuseppe Gramegna, Golfe Juan (FR)

(73) Assignee: Imec VZW, Leuven (BE)

( * ) Notice: Subject to any disclaimer, the term of this patent is extended or adjusted under 35 U.S.C. 154(b) by 327 days.

(21) Appl. No.: 18/539,394

(22) Filed: Dec. 14, 2023

(65) Prior Publication Data

US 2024/0201317 A1 Jun. 20, 2024

(30) Foreign Application Priority Data

Dec. 15, 2022 (EP) .................................... 22213734

(51) Int. Cl.

*G01S 7/00* (2006.01)
*G01S 7/03* (2006.01)
*G01S 13/58* (2006.01)
*G01S 13/86* (2006.01)

(52) U.S. Cl.

CPC ................ *G01S 7/006* (2013.01); *G01S 7/03* (2013.01); *G01S 13/584* (2013.01); *G01S 13/86* (2013.01)

(58) Field of Classification Search

CPC ........ G01S 13/584; G01S 13/86; G01S 7/006; G01S 7/03; G01S 7/038; G01S 7/352; H04B 1/44; H04B 1/48; H04B 2001/485

See application file for complete search history.

(56) References Cited

U.S. PATENT DOCUMENTS 10,613,193 B2 4/2020 Kim et al.
10,673,479 B2 * 6/2020 Fernando ............. H04B 7/0617
12,061,249 B1 * 8/2024 Loui ....................... G01S 13/90
2009/0232260 A1 * 9/2009 Hayashi ................. H04B 1/525 375/346

(Continued)

FOREIGN PATENT DOCUMENTS

CN 109031217 A 12/2018
CN 106817134 B 4/2019

(Continued)

OTHER PUBLICATIONS

Extended European Search Report and Search Opinion, Application No. EP 22213734.1, mailed Jun. 5, 2023, 9 pages.

(Continued)

*Primary Examiner* — Peter M Bythrow
(74) *Attorney, Agent, or Firm* — McDonnell Boehnen Hulbert & Berghoff LLP

(57) ABSTRACT

Example embodiments describe a radio device for wireless communication and radar sensing, the radio device including: a transmitter configured to generate a modulated RF signal and to transmit the modulated RF signal via a transmitting antenna; and a receiver configured to receive a modulated RF signal via a receiving antenna and to down-convert the received modulated RF signal. The radio device additionally includes a selector unit configured to provide the receiver with a copy of the transmit modulated RF signal, or, a local oscillator signal for down-converting the received modulated RF signal, thereby enabling wireless communication and radar sensing operation.

20 Claims, 9 Drawing Sheets

(56) References Cited

U.S. PATENT DOCUMENTS

| | | | | |
|---|---|---|---|---|
| 2015/0378017 | A1* | 12/2015 | Ferguson | G01S 13/882 342/120 |
| 2017/0041038 | A1* | 2/2017 | Kirkpatrick | H04B 1/48 |
| 2019/0361113 | A1 | 11/2019 | Ray | |
| 2020/0003866 | A1* | 1/2020 | Bauduin | G01S 7/354 |
| 2020/0229102 | A1* | 7/2020 | Gubeskys | H04W 52/146 |
| 2020/0386854 | A1* | 12/2020 | Melzer | G01S 7/032 |
| 2021/0003662 | A1 | 1/2021 | Aydogdu et al. | |
| 2022/0196796 | A1* | 6/2022 | Fiore | G01S 13/581 |
| 2022/0294511 | A1* | 9/2022 | Ali | G01S 7/006 |
| 2023/0213644 | A1* | 7/2023 | Wall | G01S 13/4454 342/43 |
| 2024/0111020 | A1* | 4/2024 | Rosu | G01S 13/931 |
| 2024/0201317 | A1* | 6/2024 | Bourdoux | G01S 13/584 |
| 2024/0353555 | A1* | 10/2024 | Rafique | G01S 13/86 |

FOREIGN PATENT DOCUMENTS

| | | |
|---|---|---|
| CN | 111308462 A | 6/2020 |
| CN | 112019232 A | 12/2020 |
| KR | 101566622 B1 | 11/2015 |
| WO | 2017187339 A1 | 11/2017 |

OTHER PUBLICATIONS

Deng, Wei, Zipeng Chen, Haikun Jia, Pingda Guan, Taikun Ma, Angxiao Yan, Shiyan Sun et al. "A D-Band Joint Radar-Communication CMOS Transceiver." IEEE Journal of Solid-State Circuits 58, No. 2 (2022): 411-427.

Bozorgi, Farhad, Padmanava Sen, André N. Barreto, and Gerhard Fettweis. "RF front-end challenges for joint communication and radar sensing." In 2021 1st IEEE International Online Symposium on Joint Communications & Sensing (JC&S), pp. 1-6. IEEE, 2021.

Barrenechea, Peli, Frans Elferink, and Johan Janssen. "FMCW radar with broadband communication capability." In 2007 European Radar Conference, pp. 130-133. IEEE, 2007.

Li, Oupeng, Jia He, Kun Zeng, Ziming Yu, Xianfeng Du, Yuan Liang, Guangiian Wang et al. "Integrated sensing and communication in 6G a prototype of high resolution THz sensing on portable device." In 2021 Joint European Conference on Networks and Communications & 6G Summit (EuCNC/6G Summit), pp. 544-549. IEEE, 2021.

Bauduin, Marc, and André Bourdoux. "Mixed-signal transmitter leakage cancellation for PMCW MIMO radar." In 2018 15th European Radar Conference (EuRAD), pp. 293-296. IEEE, 2018.

Moghaddasi, Jaber, and Ke Wu. "Multifunctional transceiver for future radar sensing and radio communicating data-fusion platform." IEEE access 4 (2016): 818-838.

Gameiro, Atílio, Daniel Castanheira, Jéssica Sanson, and Paulo P. Monteiro. "Research challenges, trends and applications for future joint radar communications systems." Wireless Personal Communications 100 (2018): 81-96.

Liu, Fan, Christos Masouros, Athina P. Petropulu, Hugh Griffiths, and Lajos Hanzo. "Joint radar and communication design: Applications, state-of-the-art, and the road ahead." IEEE Transactions on Communications 68, No. 6 (2020): 3834-3862.

Wild, Thorsten, Volker Braun, and Harish Viswanathan. "Joint design of communication and sensing for beyond 5G and 6G systems." IEEE Access 9 (2021): 30845-30857.

Su, Yi-Pei, Chao-Yen Huang, and Sao-Jie Chen. "A 24-GHz fully integrated CMOS transceiver for FMCW radar applications." IEEE Journal of Solid-State Circuits 56, No. 11 (2021): 3307-3317.

Kalantari, Milad, Wang Li, Hossein Shirinabadi, Ali Fotowat-Ahmady, and C. Patrick Yue. "A W-band single-antenna FMCW radar transceiver with adaptive leakage cancellation." IEEE Journal of Solid-State Circuits 56, No. 6 (2020): 1655-1667.

Ma, Taikun, Wei Deng, Zipeng Chen, Jianxi Wu, Wei Zheng, Shufu Wang, Nan Qi, Yibo Liu, and Baoyong Chi. "A CMOS 76-81-GHz 2-TX 3-RX FMCW radar transceiver based on mixed-mode PLL chirp generator." IEEE Journal of Solid-State Circuits 55, No. 2 (2019): 233-248.

* cited by examiner

RADIO DEVICE FOR WIRELESS COMMUNICATION AND RADAR SENSING

CROSS-REFERENCE TO RELATED APPLICATIONS

The present application is a non-provisional patent application claiming priority to European Patent Application No. EP 22213734.1, filed on Dec. 15, 2022, the contents of which are hereby incorporated by reference.

FIELD OF THE DISCLOSURE

The present disclosure relates to a radio device for wireless communication and radar sensing.

BACKGROUND

Current wireless communication networks (e.g. 5G and future wireless communication networks employing wireless communication standards such as 6G and higher rely on the radio devices in the network being not only able to communicate but also to sense the environment, with the aim of providing services such as improved transportation management, better positioning service, public safety, and/or improved wireless communication networks tailored to the gathered environment information.

Sensing the environment can include sensing other radio devices in the wireless communication network as well as sensing any other stationary or non-stationary objects in the surrounding of the radio device such as buildings, traffic signs and lights, any means of transportation such as bikes, cars, buses, trucks, as well as human beings, animals, trees, and so on. Sensing the radio devices in the wireless network can include cooperative sensing, e.g., sensing employing information exchange through the wireless network, however, sensing of any of the other stationary or non-stationary objects may include a non-cooperative sensing, e.g., sensing by means of a radar, leveraging flexibility in the transmitted and processed waveform and the related hardware. Such radio devices may include the capability to support high-speed communication standards, such as 5G, 6G and even higher, while also offering radar sensing capabilities.

However, current state of the art radio devices integrating both wireless communication and radar sensing do not offer cost and area effective integration of both functionalities, hindering adoption as a market solution. Further, these radio devices offer limited communication bandwidth and/or limited range resolution and suffer from transmitter spillover which can severely impact their sensing sensitivity.

SUMMARY

The present disclosure provides radio devices for wireless communication and radar sensing that exhibit cost and area efficient integration of communication and radar sensing functionalities, providing improved communication bandwidth, range resolution, and sensitivity. Such radio devices for wireless communication and radar sensing may be implemented to include beamforming and MIMO.

In a first aspect, a radio device is provided that includes: (i) a transmitter configured to generate a modulated RF signal and to transmit the modulated RF signal via a transmitting antenna; and (ii) a receiver configured to receive a modulated RF signal via a receiving antenna and to down-convert the received modulated RF signal. The radio device of the first aspect additionally include a selector unit configured to provide the receiver with a copy of the transmit modulated RF signal, or, a local oscillator signal for down-converting the received modulated RF signal.

According to example embodiments, the radio device can further include an LO signal generator configured to generate the LO signal and to provide the LO signal to the transmitter for generating the modulated RF signal, and, to provide the LO signal to the receiver for down-converting the received modulated RF signal.

According to example embodiments, the receiver can further include a switchably connectable high-pass filter for suppressing the transmitter spill-over.

According to example embodiments, the switchably connectable high-pass filter can include a first low pass filter section and a second switchably connectable low-pass filter section. The first low-pass filter section acts as the low-pass filter in communication mode, while the first low-pass filter section together with the switchably connectable second low-pass filter section form in the radar mode a band-pass filter which provides high-pass filtering for suppressing the transmit spillover and the low-pass filtering for removing undesired high-frequency components.

According to example embodiments, the second switchably connectable low-pass filter section can be programmable. Further, the first low-pass filter section may also be programmable.

According to example embodiments, the radio device can additionally include a digital processor configured to generate a digital FMCW waveform and digital communication symbols and to extract communication symbols and range, Doppler, and, optionally, angle information.

According to an example embodiment, the receiver can include a mixer unit including a first mixer and a second mixer connected in parallel, and wherein the first mixer is configured to provide a baseband signal at its output by down-converting the modulated RF signal, RX_IN, being fed at a first input of the first mixer by means of the LO signal being fed at a second input of the first mixer, and wherein the second mixer is configured to provide a beat signal at its output by down-converting the modulated RF signal, RX_IN, being fed at a first input of the second mixer by means of the copy of the transmit modulated RF signal being fed at a second input of the second mixer.

According to example embodiments, the first mixer and the second mixer can be configured to being fed, via respective electrical transformers, the LO signal and the copy of the transmitted modulated RF signal respectively.

According to an alternative embodiment, the selector unit can include a first mixer and a second mixer connected in parallel, and wherein the first mixer is configured to provide the LO signal being fed at its input to its output, the second mixer is configured to provide the copy of the transmit modulated RF signal being fed at its input to its output.

The radio device can further include electrical transformers coupled to the selector unit and configured to feed the LO signal and the copy of the transmitted modulated RF signal to the first mixer and to the second mixer respectively.

The electrical transformers can be controlled such that the first mixer is operational when the radio device is performing wireless communication, and the second mixer is operational when the radio device is performing radar sensing.

According to an example embodiment, the transmit modulated RF signal can be a single-carrier signal, an OFDM signal, or an FMCW signal.

According to example embodiments, the radio device can be a beamforming radio device. In such examples, the beamforming radio device can be configured to receive a plurality of modulated RF signals and comprises a signal splitter configured to provide the receiver with a plurality of copies of the transmit modulated RF signal, or, a plurality of local oscillator signals for down-converting the respective modulated RF signals.

The transmit antennas, TXANTs, can form a beamforming antenna. Such a beamforming antenna can allow the direction of the radiated beam to be changed by changing the phase of the individual signals in the transmit antennas. The selection unit can operate in the same manner as described above with reference to FIG. 3 and FIG. 4A.

According to example embodiments, the radio device can be a multiple-input and multiple-output, MIMO, radio device, and the MIMO radio device can be configured to receive a plurality of modulated RF signals and includes a signal splitter configured to provide the receiver with a plurality of copies of the transmit modulated RF signal, or a plurality of local oscillator signals for down-converting the respective modulated RF signals.

BRIEF DESCRIPTION OF THE FIGURES

The above, as well as additional objects, features, and benefits, may be understood through the following illustrative and non-limiting detailed description, with reference to the appended drawings. In the drawings like reference numerals will be used for like elements unless stated otherwise.

All the figures are schematic, not necessarily to scale, and generally only show parts to elucidate example embodiments, wherein other parts may be omitted or merely suggested.

DETAILED DESCRIPTION

Figure 1:
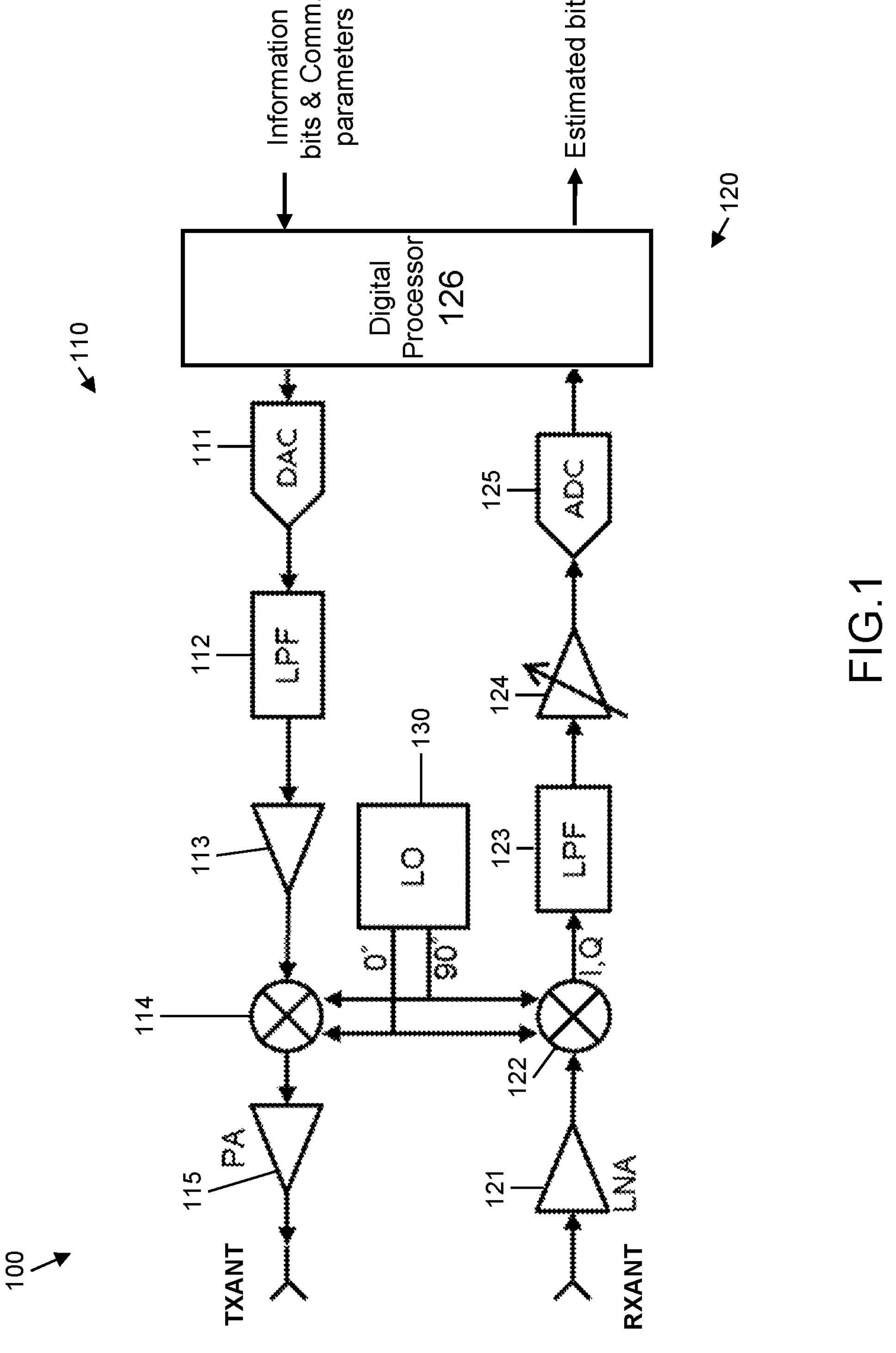
FIG. 1 shows a block schematic of a conventional wireless communication transceiver device, according to an example embodiment.

FIG. 1 shows a block schematic of a conventional quadrature wireless communication transceiver device 100. The transceiver device 100 may employ digital modulation such as single carrier, SC, modulation, or orthogonal frequency-division multiplex, OFDM, modulation. These modulation schemes typically use phase modulation or quadrature amplitude modulation, QAM, such as 2-, 4-, 8- or higher QAM. Examples of phase modulation include binary phase-shift keying, BPSK, quadrature phase-shift keying, QPSK, or multilevel phase shift keying, e.g., 4-PSK, 8-PSK and so on.

The quadrature transceiver device 100 comprises a transmitter 110 and a receiver 120. The transmitter 110 and the receiver 120 are separated, i.e., have individual antennas, and do not transmit and receive within the transceiver 100 at the same time. In transmit mode, the information bits are first encoded by the digital processor 126 into digital TX symbols which are then fed to the DAC 111. The DAC 111 converts them into an analogue signal which is then filtered by the low pass filter, LPF, 112, amplified by the amplifier 113, and upconverted to radio frequency, RF, by the mixer 114 by means of quadrature LO signals generated by the local oscillator, LO, 130. In this figure, the RF signal outputted by the mixer 114 is a quadrature modulated RF signal, e.g., 16-QAM. The RF signal is further amplified by the power amplifier 115 and then transmitted via the transmit antenna, TXANT.

In receive mode, the RF signal received via the receive antenna, RXANT, is first fed to the low noise amplifier, LNA, 121, and then to the mixer 122. The mixer 122 down-converts it to baseband, BB, frequency by means of the quadrature LO signals generated by the LO 130. The BB signal is then filtered by the LPF 123, amplified by the amplifier 124, digitized by the ADC 125, and finally decoded by the digital processor 126 to estimate the received information bits.

Figure 2:
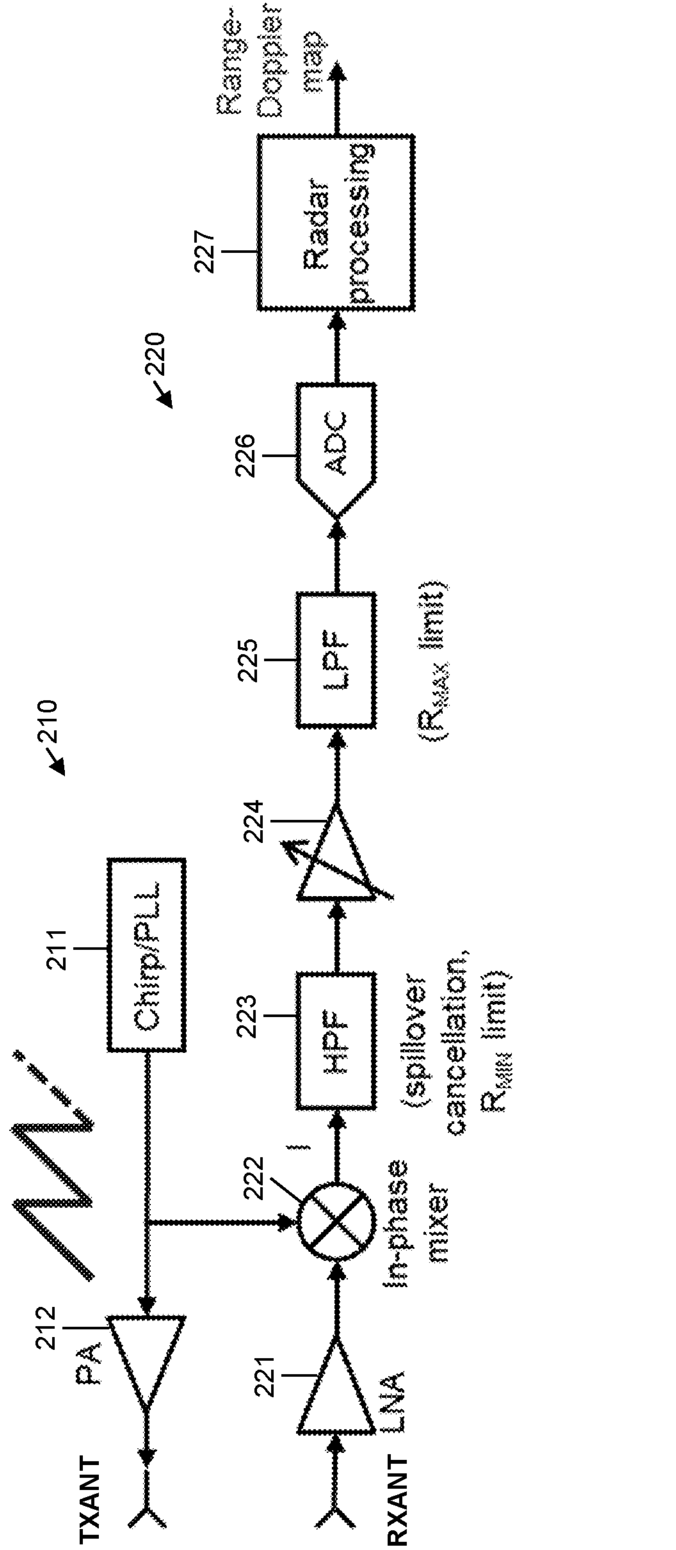
FIG. 2 shows a block schematic of conventional FMCW radar device, according to an example embodiment.

FIG. 2 shows a block schematic of a conventional frequency-modulated continuous-wave, FMCW, radar device 200. In contrast to the digital communication transceiver 100 of FIG. 1, the radar device 200 is configured such that both the radar transmitter 210 and the radar receiver 220 operate simultaneously to detect objects in the environment. In this case, the chirp generator e.g., a phase-lock loop, PLL, 211 of the radar transmitter 210 generates a linear frequency ramp, commonly known as chirp. The generated chirp signal is then amplified by the power amplifier 212 and transmitted via the transmit antenna, TXANT. At the same time, the radar receiver is also operational so that echoes or reflections of the transmitted chirp signal from objects in the environment are received by the radar receiver via the receive antenna, RXANT. The received signal is amplified by the LNA 221 and downconverted or de-chirped by the mixer 222 with a copy of the transmitted signal, i.e., the chirp signal. The downconverted signal is then filtered by the high pass filter, HPF, 223, amplified by the amplifier 224, low pass filtered by the LPF 225 and finally digitized by the ADC 226. The digitized signal is the processed by the radar processor 227 to extract the range-Doppler map which is then used to localize the objects in the environment.

Since the radar transmitter and radar receiver are operating simultaneously, an amount of the transmitted signal leaks to the radar receiver 220. This leaked signal is commonly referred to as a transmit leakage or a transmit spillover. As the leaked signal travels the shortest distance, it is a very strong signal that masks weak reflections or echoes from objects in the environment, thus significantly reducing the sensitivity of the radar device. The leaked signal further saturates the radar receiver up to the ADC 226, which results in significant signal degradation such as increased sidelobes and/or detection of ghost targets.

In the case of FMCW radar, the de-chirping is done in frequency domain, i.e., the mixer 222 outputs a signal with a beat frequency which corresponds to the frequency difference between the received and the transmit signals. As the transmit spillover is a signal that travels the shortest distance, i.e., from transmit antenna to receive antenna, the de-chirping translates the transmit spillover at DC or near DC frequency. Translating the spillover at or near DC allows to suppress the transmit spillover by filtering the de-chirped signal with the HPF 223. Employing FMCW modulation thus allows to effectively remove the transmit spillover without affecting the echoes from the objects in the environment.

However, integrating the wireless communication transceiver device and the FMCW radar device is not straightforward because the constraints for the wireless communication transceiver device and the radar device are not identical. The wireless communication transceiver uses digital signal generation, i.e., the information bits, as a signal source at digital baseband and a fixed LO signal for both transmit up-conversion and receive down-conversion for up- and down-conversion whereas the FMCW radar uses a chirp PLL signal generated directly at RF frequency as signal source and, in addition, uses this chirp signal for down-conversion in the receiver. Further, the wireless communication transceiver has a high dependence on the spectral purity of the LO signal while an FMCW radar has a high dependence on the linearity of the frequency ramp of the chirp signal. Generating an LO signal that has low phase noise and low spurious tone and at the same time capable a linearly varying frequency is extremely challenging. Further, a wireless communication transceiver, for example a zero-IF wireless transceiver, can include a LPF with DC cancellation to preserve the integrity of the received signal, while a FMCW radar can include a HPF after the RX mixer for suppressing the transmit leakage. As a result, designing a transceiver architecture supporting both modes of operation with maximum hardware reuse is thus not trivial.

The present disclosure addresses the challenges of radar and wireless communication transceivers integration at minimal cost in terms of hardware implementation and most of all without sacrificing their performance, e.g., alleviating the transmit spillover—a crucial problem for FMCW radars.

Moreover, the proposed transceiver architecture allows for an easy chirp generation in radar mode, where the generation of the FMCW signal is done digitally at lower frequency which is then mixed with a fixed frequency LO signal. This alleviates constraints on the LO signal in radar mode and allows for extra flexibility thanks to the digital implementation.

The proposed transceiver architecture will be now explained in detail with reference to FIG. 3 through FIG. 6 below.

Figure 3:
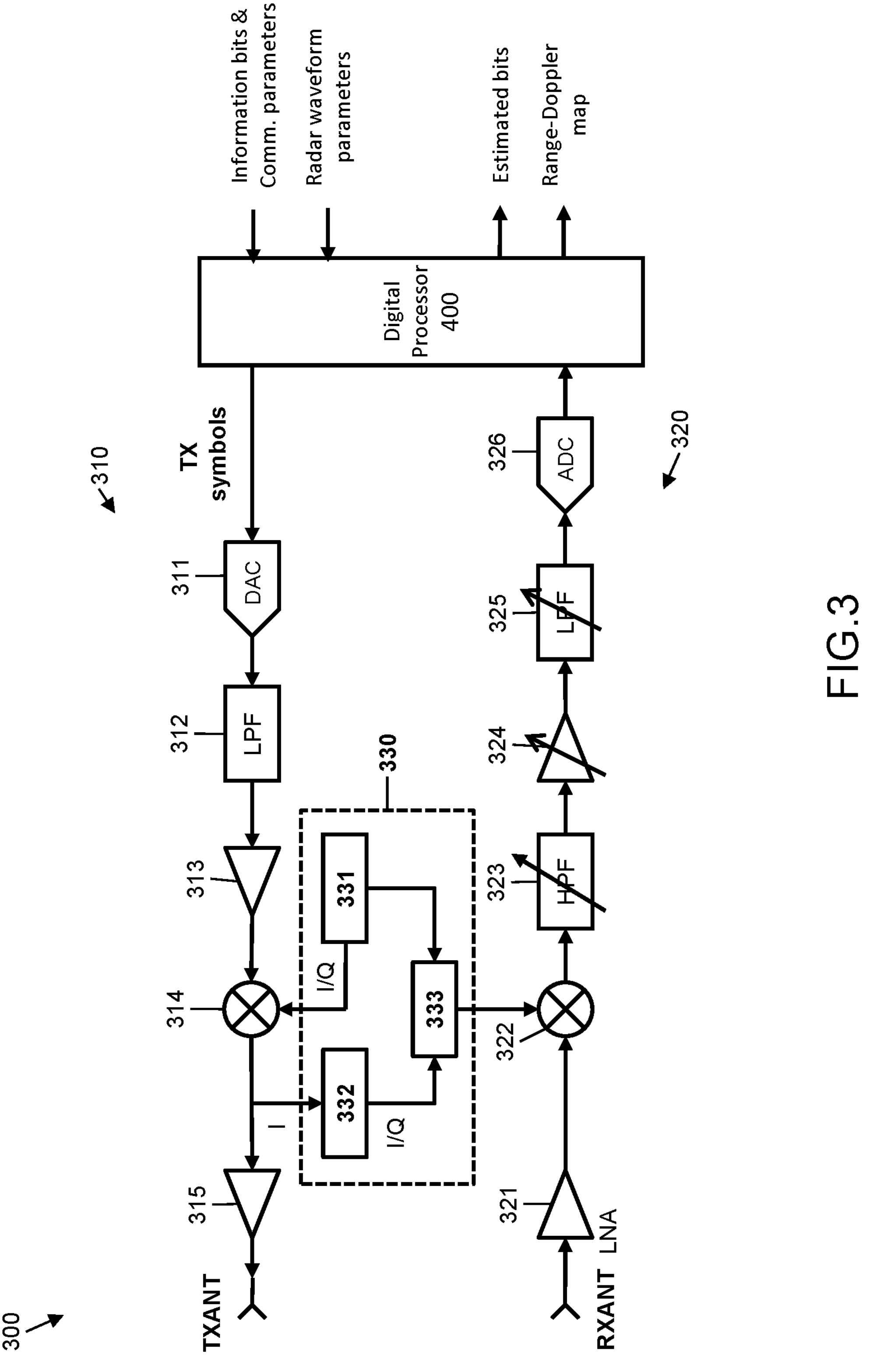
FIG. 3 shows a block schematic of a radio device for wireless communication and radar sensing, according to an example embodiment.

FIG. 3 shows a simplified block schematic of a radio device for wireless communication and radar sensing 300 according to an example embodiment of the present disclosure. Details of the quadrature implementation of the radio device 300 are described further below with reference to FIG. 5. The radio device 300 can operate in two different modes, i.e., in communication mode as a wireless communication transceiver device or in sensing or radar mode as an FMCW radar device.

The radio device 300 of FIG. 3 may employ digital modulation such as single carrier, SC, modulation, or orthogonal frequency-division multiplex, OFDM, modulation like the wireless transceiver device of FIG. 1. Thus, the radio device 300 may support any phase modulation schemes such as BPSK, QPSK, or multilevel phase shift keying, e.g., 4-PSK, 8-PSK and so on, or any quadrature amplitude modulation, QAM, such as 2-, 4-, 8- or higher QAM, as the conventional wireless transceiver device 100. Similarly, the radio device 300 of FIG. 3 may sense the environment like the radar device 200 of FIG. 2.

The radio device 300 comprises a transmitter 310 and a receiver 320. The transmitter 310 and the receiver 320 are separated, i.e., have individual antennas, RXANT and TXANT. In communication mode, the transmitter and receiver do not operate at the same time. In transmit communication mode, the information bits are first encoded by the digital processor 400 into digital TX symbols which are then fed to the DAC 311. The DAC 311 converts them into an analogue signal which is then filtered by the low pass filter, LPF, 312, amplified by the amplifier 313, and upconverted to radio frequency, RF, by the mixer 314 by means of the LO signal generated by the LO signal generator 331. In this figure, the RF signal outputted by the mixer 314 is a quadrature modulated RF signal, e.g., 16-QAM. The RF signal is further amplified by the power amplifier 315 and then transmitted via the transmit antenna, TXANT.

In receive communication mode, the RF signal received via the receive antenna, RXANT, is first amplified by the low noise amplifier, LNA, 321, and then fed to the mixer 322. The mixer 322 downconverts the received RF signal to baseband, BB, frequency by means of the LO signal generated by the LO signal generator 331. The LO signal is fed to the receiver 320 via a selector unit 333. The BB signal is optionally filtered by the HPF 323. Instead of high-pass filtering, a DC cancellation may be applied to the BB signal by means of a DC cancellation unit (not shown in the figure). The BB signal is then amplified by the amplifier 324, filtered by the LPF 325 and then digitized by the ADC 326. The digitized signal is then finally decoded by the digital processor 400 to estimate the information bits.

In sensing or radar mode, the transmitter 310 and the receiver 320 operate simultaneously. In this case, the digital processor 400 generates a digital FMCW waveform. The digital FMCW waveform is converted to an analogue signal by the DAC 311. This analogue FMCW signal is then filtered by the low pass filter, LPF, 312, amplified by the amplifier 313, and upconverted to radio frequency, RF, by the mixer 314 by means of the LO signal generated by the LO signal generator 331. In this mode, however, as an FMCW waveform is upconverted to RF frequency, the quadrature modulated RF signal outputted by the mixer 314 is a chirp signal analogous to the signal transmitted by the radar transmitter 210 in FIG. 2. The resulting chirp signal is further amplified by the power amplifier 315 and then transmitted via the transmit antenna, TXANT.

As the receiver 320 is operational at the same time as the transmitter 310, echoes or reflections of the transmitted chirp signal from objects in the environment are received by the receiver 320 via the receive antenna, RXANT. The received signal is amplified by the LNA 321 and down-converted or de-chirped by the mixer 322 with a copy of the transmitted signal, i.e., the chirp signal, which is fed to the mixer 322 via the selector unit 333. In this case, since the transmitted signal is a quadrature modulated RF signal, the RX mixer 322 needs to receive an I and Q versions of the transmitted chirp signal to properly de-chirp the received signal. For this purpose, the copy of the chirp signal is first fed to an I/Q signal generator 332 which outputs I and Q copies of the chirp signal.

The I and Q copies of the chirp signal are then fed to the RX mixer 322 via the selector unit 333. Next, the de-chirped signal is filtered by the high pass filter, HPF, 323 to suppress the TX spillover, and then amplified by the amplifier 324, low pass filtered by the LPF 325, digitized by the ADC 326, and finally processed by the digital processor 400 to extract the range-Doppler map which is then used to localize the objects in the environment.

The digital processor 400 thus performs the functionalities of the digital processor as in conventional wireless communication transceiver device such as the one shown in FIG. 1 as well as the functionalities of the radar processor as in conventional FMCW radar such as the one shown in FIG. 2.

Note, that in radar mode, the receiver 320 can operate without a quadrature LO but using an I/Q architecture with associated quadrature LO signals can provide benefits, e.g., a 3 dB improvement in SNR and the possibility to detect interference.

The example radio device of FIG. 3 is highly based on the conventional architecture of the wireless communication transceiver device of FIG. 1 which is modified to support an FMCW radar mode of operation while ensuring minimum hardware modifications to the architecture and minimum additional hardware components. This allows the radio device of FIG. 3 to support conventional modulations such as the ones mentioned above for communication and to support FMCW radar mode of operation by generating a digital FMCW waveform and converting it into an analogue signal in the same way as the transmit symbols in communication mode. The generated chirp signal thus has the same bandwidth as the bandwidth of the communication signal. Further, this way of generating the chirp signal, an LO signal with a fixed frequency which is modulated or superimposed with the FMCW signal, allows using a simple LO signal generator instead of the complex PLL 211 as in the conventional radar device of FIG. 2. Moreover, the chirp generating PLL 211 of FIG. 2 is highly dependent on chirp slope linearity whereas the chirp slope linearity in the chirp signal generated using the radio device 300 is easily achieved with the digital generation of the FMCW waveform. This means that the constraints on the LO generator 331 are less stringent in contrast to the constraints for the PLL in the conventional radar device of FIG. 2 where a compromise between precision in the waveform and bandwidth of the generated chirp signal may be made.

As a result, the radio device of FIG. 3 enables both operations without compromise in the device's performance in both communication mode and radar mode.

Figure 4A:
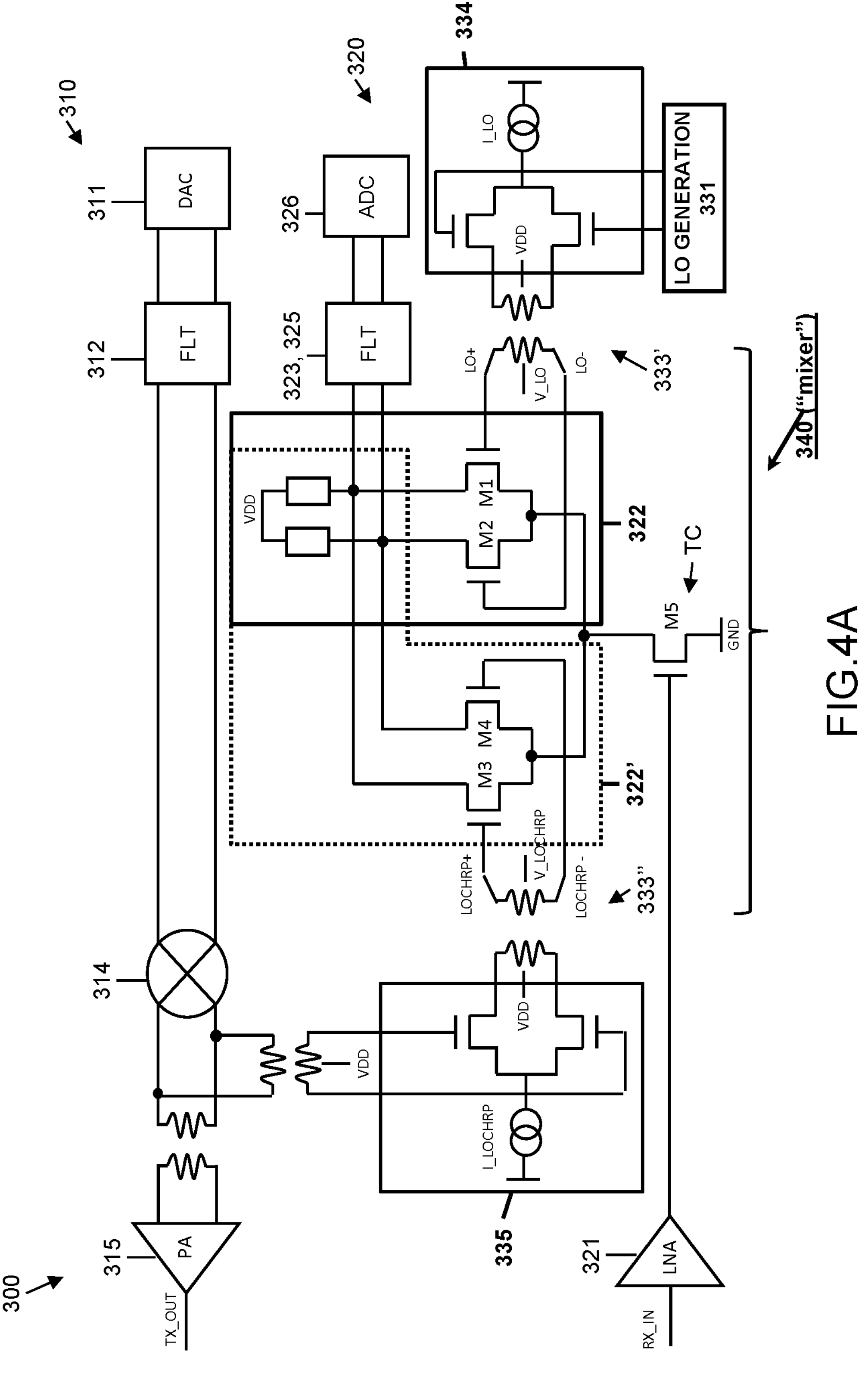
FIG. 4A shows an example implementation of the selector unit of the radio device for wireless communication and radar sensing, according to an example embodiment.

The selector unit 333 thus enables the radio device 300 to operate in communication or in radar mode and will be detailed now with reference to FIG. 4A. For simplicity reasons, FIG. 4A shows only the parts of the radio device of FIG. 3 relevant for the explanation of the operation of the selector unit 333 where parts that are identical to those shown in FIG. 3 are denoted by identical reference signs.

Figure 5:
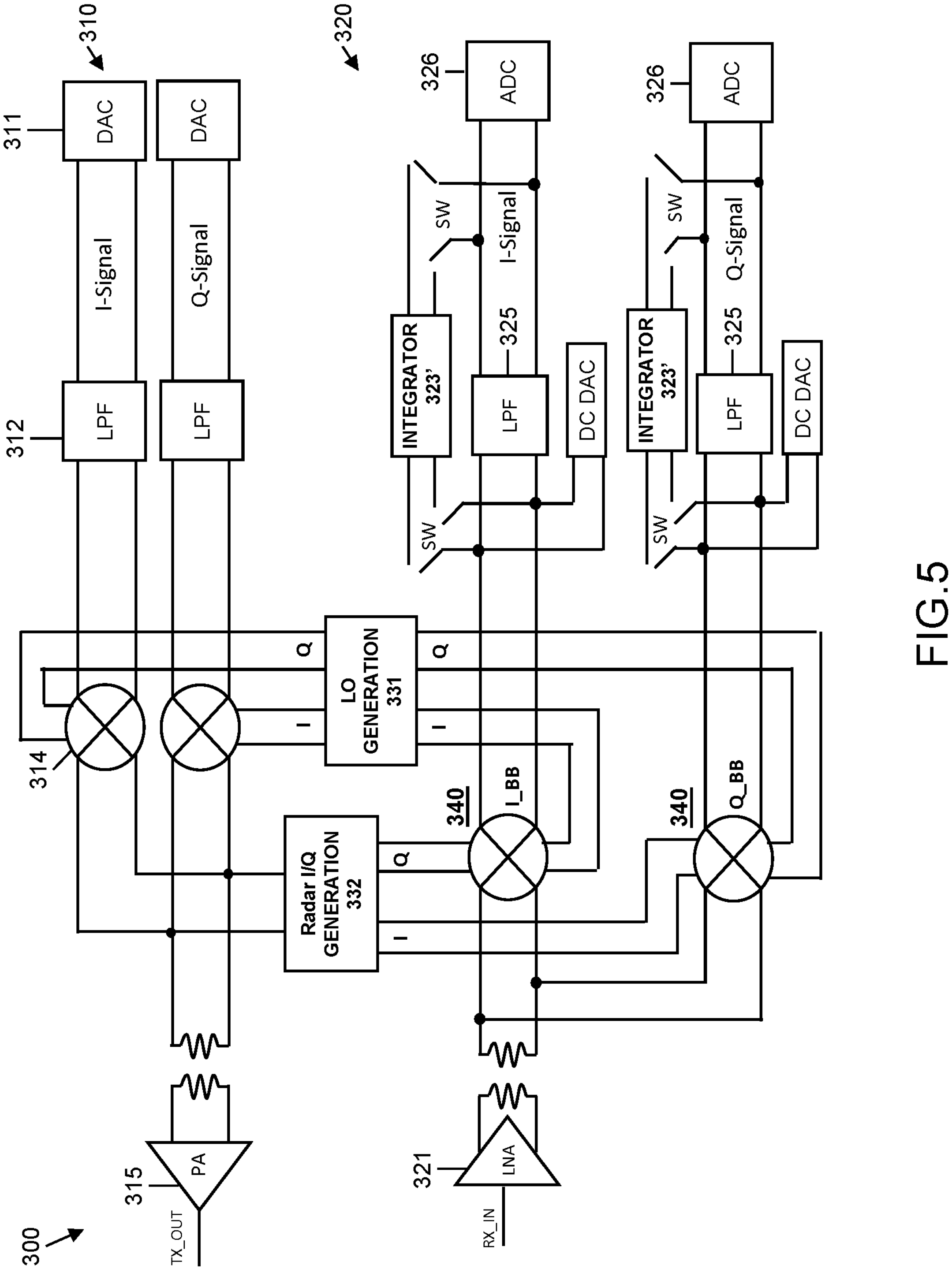
FIG. 5 shows a block schematic of a quadrature radio device for wireless communication and radar sensing, according to an example embodiment.

FIG. 4A shows the implementation of the I-branch of the selector unit 333 only. The I/Q implementation, however, can be extended by assuming the same scheme for the I and Q signal, i.e., duplicating the mixers and the LO signals as shown in FIG. 5 and detailed further below. The selector unit 333 comprises a mixer 340 composed by a switching quad of two parallel NMOS transistor pairs M1 to M4, 322 and 322', and a transconductance stage, TC, composed of the transistor M5. The transconductance stage is configured to the feed the received signal, RX_IN, while the respective NMOS pairs of the switching quad are fed with the LO signal from the LO generator 331 or the chirp signal, LO_CHRP, from the transmitter. More specifically, the first NMOS transistor pair, M1-M2, is connected to an electrical transformer 333' to receive the LO signal generated by the LO signal generator 331 through the buffer 334, while the second NMOS pair, M3-M4, is connected to another electrical transformer 333" to receive a copy of the signal to be transmitted or the chirp signal, i.e., LOCHRP signal through buffer 335.

To enable communication or sensing mode, the operation of the mixer 340 is controlled by controlling the operation of the respective buffers 334, 335 and electrical transformers 333', 333" as shown in Table 1 below, where VBIAS, IBIAS are suitable bias voltage and bias current to turn on transistors M1, M2, M3, and M4.

As it can be seen, by controlling the current sources I_LO and I_LOCHRP of the respective buffers 334 and 335 and the voltage at the second winding, i.e., V_LO and V_LOCHRP of the respective electrical transformers, the mixer is controlled to feed to the filter 323,325 the received signal down-converter with either the LO signal generated by the LO generator 331 or the chirp signal from the transmitter.

TABLE 1

Settings for the selector unit and associated buffers

| Control Parameter | Radar mode | Communication mode | Comment |
|---|---|---|---|
| V_LOCHRP | VBIAS | GND | Activates/deactivate the LO_CHIRP section in the RX_MIX. |
| I_LOCHRP | IBIAS | 0 | Activates/deactivate the LO_CHIRP BUFFER that drives the RX_MIX |
| V_LO | GND | VBIAS | Activates/deactivate the LO BUFFER that drives the RX_MIX. |
| I_LO | 0 | IBIAS | Activates/deactivate the LO BUFFER that drives the RX_MIX. |

More specifically, in sensing mode, the second NMOS transistor pair, M3-M4, is activated by providing a bias current, IBIAS, to the current source ILO_CHRP of the buffer 335 and by supplying VDD at the centre tap of the primary winding and a bias voltage VBIAS, at V_LOCHRP the centre tap of the secondary winding of the electrical transformer 333". At the same time, the first NMOS transistor pair, M1-M2, is deactivated, by providing a 0 current at I_LO of the buffer 334 and by supplying VDD at centre tap of the primary winding and supplying GND at the centre tap of the secondary winding of the electrical transformer 333'.

In communication mode, the first NMOS pair M1-M2 is activated by providing a bias current, IBIAS, to the I_LO of the buffer 334 and by supplying VDD at the centre tap of the primary winding and a VBIAS at the node V_LO, centre tap of the secondary winding of the electrical transformer 333', while the second NMOS pair M3-M4 is disabled by providing a 0 current to the I_LOCHRP of the buffer 335 and by supplying VDD at centre tap of the primary winding and supplying GND at the centre tap of the secondary winding of the electrical transformer 333".

In this figure, the copy of the transmit signal is extracted at the output of the transmit mixer 314 and is directly reinjected into the mixer 340 in radar mode. This hardware efficient configuration allows for high-frequency mode of operations thus enabling the radio device to be operated using 5G, 6G and even higher wireless communication standard.

Further, it is worth noting that the since transistor pairs M1-M2 and M3-M4 are identical, when switching between radar and communication mode the capacitive load presented at the drain of transistor M5 and at the input of the filter 325 is unchanged, thus avoiding any shift in operating frequency of the transmitter mixer 314. The buffers 335 and 334 are sized as a trade-off between loading to the TX mixer 314 and LO generator 331 and the driving capability of the buffers. The loading to mixer 314 can be embedded into the inter-matching of the mixer 314 and the PA 315. Alternatively, the shift in self-resonance frequency observed at the transmit mixer 314 caused by the change of input capacitance of buffer 334, is reduced thanks to the inductive coupling of the TX section to the buffer 335 and the inductive coupling of the buffer 334 to the mixer and thanks to the minimal size of the buffers 334 and 335. The performance of the radio device may be further improved by adding a tuneable capacitance at the drain of transmit mixer 314 to compensate for the change in input capacitance associated by the activation and deactivation of LO_CHIRP buffer 335.

Although the description above explains the operation of I—only implementation of the selector unit 333, the skilled person would understand that the circuit can be extended to an I/Q implementation. In such a case, the signal at the output of the TX MIX, 314 would be first fed to a I/Q generator 332 (as shown in FIG. 3) to re-generate the I/Q copies of the transmit signal, i.e., I/Q LO_CHIRP and the LO signal generator 331 is to be replaced with an I/Q LO signal generator. The respective I-copies of the chirp signal and the LO signal will be fed to the respective buffers 335 and 334 and to the mixer 340 as shown in FIG. 4A, while the Q-copies of the chirp signal and the LO signal will be fed to another set of buffers 335 and 335 and an additional mixer 340 in the same way as shown in FIG. 4A. The output of the mixers 240 are then fed to respective I/Q branches of the receivers as shown in FIG. 5.

Figure 4B:
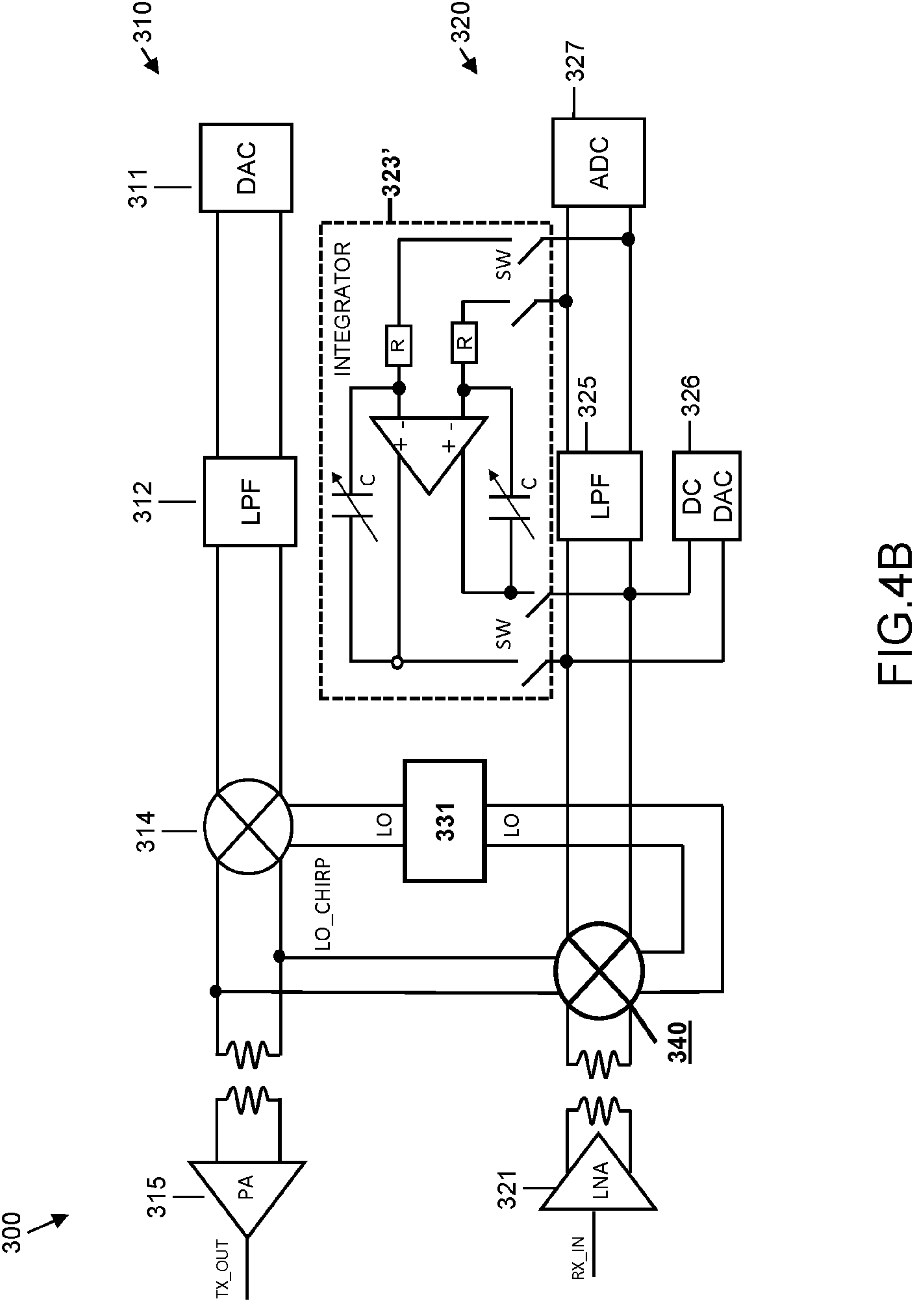
FIG. 4B shows an example implementation of the high-pass filter of the radio device for wireless communication and radar sensing, according to an example embodiment.

FIG. 4B shows an example implementation of the high-pass filter 323 and the low-pass filter 325 of FIG. 3 and FIG. 4A above. Herein again, only the relevant parts of the radio device of FIG. 3 have been shown for simplicity reasons with the parts that are identical to those shown in FIG. 3 being denoted by identical reference signs.

As it can be seen from the figure, an integrator section 323' is provided that is switchably connectable to the LPF 325 via the switches, SW. The integrator section 323' implements a LPF which cut-off frequency can be configured by tuning the variable capacitors C.

In communication mode, the integrator section 323' is disconnected from the LPF 325, i.e., the switches SW are opened, thus the receiver 320 is configured to low pass filter the received downconverter signal. In radar more, however, the switches SW are closed thus connecting the integrator section 323' in feedback around the LPF 325. In this case, if for example the integrator 323' implements first-order transfer function $H(s)=1/ST_z$ and the LPF 325 implements a first order transfer function $$G(s) = \frac{G_o}{1 + s\tau_p},$$

the result is a band-pass filter, BPF, with a transfer function $$G_T(s) = \frac{G(s)}{1 + G(s)\cdot H(s)} = \frac{\frac{G_o}{1 + s\tau_p}}{1 + \frac{G_o}{1 + s\tau_p}\cdot\frac{1}{s\tau_z}} = \frac{s\tau_z G_o}{G_o + s\tau_z\cdot(1 + s\tau_p)}$$

which is equivalent to a combination of a HPF and a LPF, assuming zero is well spaced by 1st pole. Thus, in radar mode, the LPF 325 can be easily reconfigured into a BPF to provide both a high pass filtering needed to suppress the TX spillover and a low pass filtering needed to remove undesired high-frequency components. As a result, in radar mode, the high-pass filtering and the low-pass filtering functionalities provided by the HPF 323 and the LPF 325 of FIG. 3 are herein provided by the combination of the LPF 325 and the integrator section 323'. Further, since both the LPF 325 and the integrator section 323' are operating at baseband frequency, there is no penalty in connecting and disconnecting the integrator section to the LPF.

Furthermore, the DC DAC 236 can be used in wireless for DC cancellation and in radar mode to cancel LO leakage generated directly on chip, associated to direct LO coupling at the RF port of the RX mixer.

FIG. 5 shows a block schematic of the quadrature radio device for wireless communication and radar sensing of FIG. 4A and FIG. 4B illustrating the architecture of the respective I and Q branches of the transmitter and receiver. Herein again, only the relevant parts of the radio device of FIG. 4A and FIG. 4B have been shown for simplicity reasons with the parts that are identical to those shown in FIG. 4A and FIG. 4B being denoted by identical reference signs. More specifically, the amplifier 313, 324 of the respective I and Q transmit and receive branches have been omitted along with the digital processor 400, while the I and Q mixers 340, the integrator sections 323' and the LPFs 325 in the respective receiver branches are shown. The I/Q mixers 340 implement both the functionality of the selector unit 333 as well as the functionality of the receiver mixer 322. The output of the I/Q mixers are thus I/Q BB signals, I_BB and Q_BB which are then respectively filtered, digitized and so on as shown in the figure.

Figure 6A:
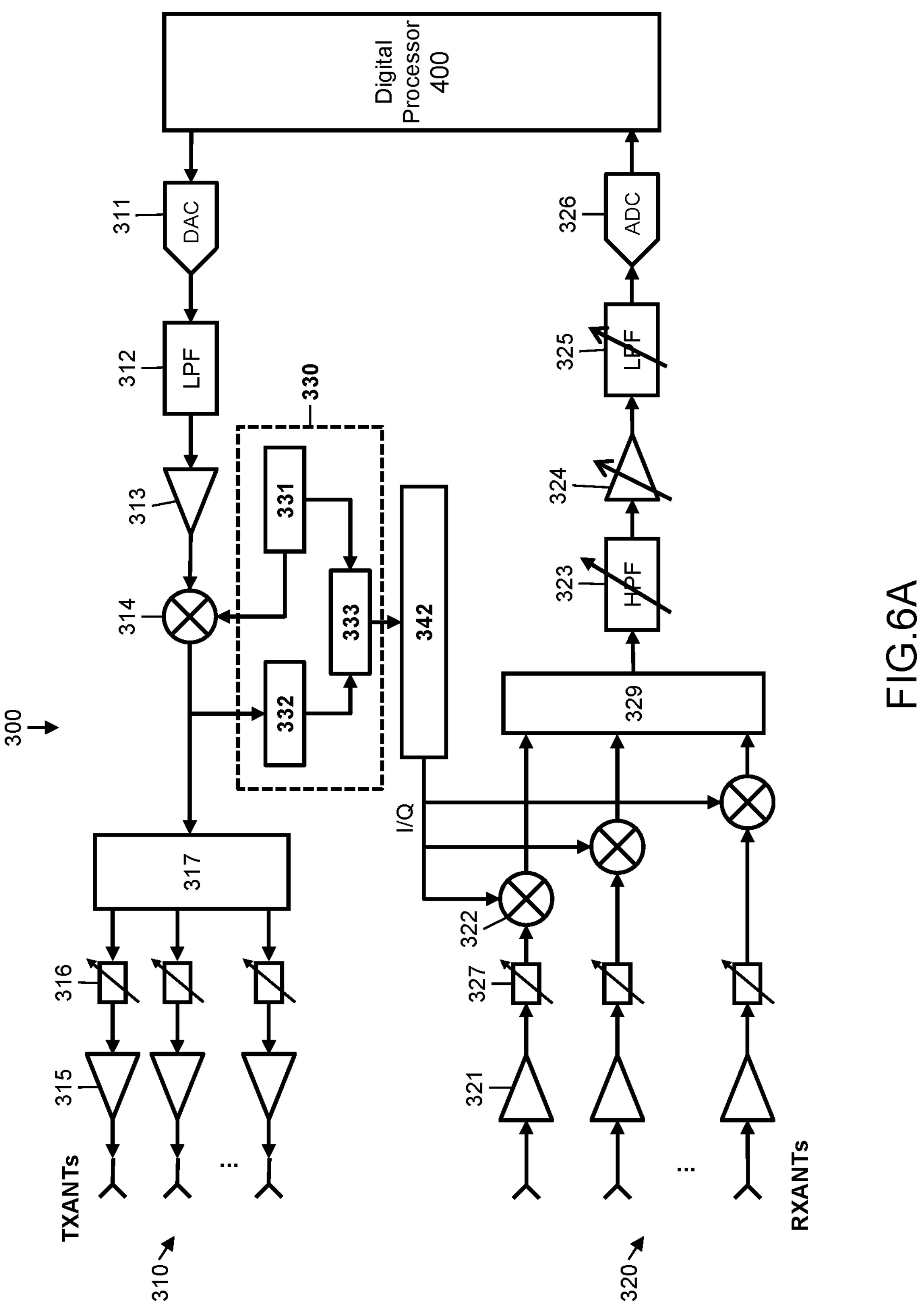
FIG. 6A shows a block schematic of a beamforming radio device for wireless communication and radar sensing, according to an example embodiment.

FIG. 6A shows a block schematic of a beamforming radio device for wireless communication and radar sensing according to an example embodiment of the present disclosure implementing analogue beamforming at the transmitter and receiver in both communication mode and sensing mode. Here the parts of the beamforming radio device which are identical to those shown in FIG. 3 are denoted with identical reference signs. In addition to the radio device shown in FIG. 3, the transmitter 310 of radio device of FIG. 6A comprises a splitter 317 which splits the RF signal to be transmitted into N copies and N amplifiers 315 and N transmit antennas, TXANTs, each of them performing the same functionality as the ones in FIG. 3. In addition, the transmitter of the MIMO radio device comprises N phase-shifters 316 which phase-shift the respective RF signals prior to their amplification by the amplifiers 315. Similarly, in addition to the radio device of FIG. 3, the receiver 320 of the radio device comprises N copies of the receiver antennas, RXANTs, N LNAs 321 and N mixers 322, each of them performing the same functionality as the ones in the receiver of FIG. 3. Additionally, the receiver of the beamforming radio device comprises N phase-shifters 327 which phase shift the received signal prior to down-converting them to BB frequency and a summator 329 which sums the N BB signals to provide a down-converted received signal. The down-converts received signal is then processed as described in FIG. 3. Furthermore, the receiver 320 of the beamforming radio device comprises an LO splitter 342 which in communication mode splits the LO signal or in sensing mode splits the copy of the transmitted signal into N copies corresponding to the number of RXANTs. The N copies of the LO signal or the transmitted signals are then respectively fed to N mixers 322 for the down-conversion of the respective RF signals.

Figure 6B:
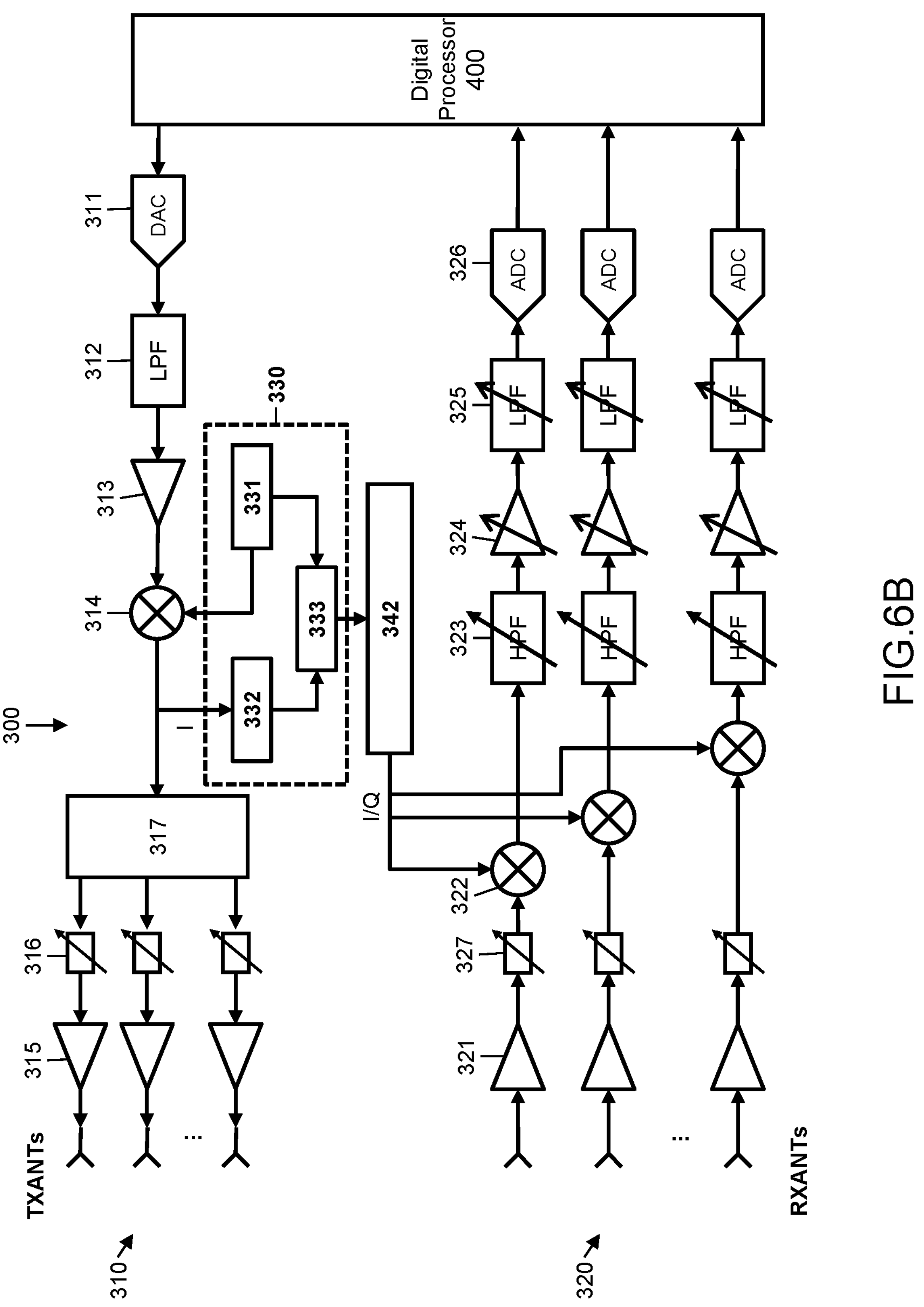
FIG. 6B shows a block schematic of a MIMO or beamforming radio device for wireless communication and radar sensing, according to an example embodiment.

FIG. 6B shows a block schematic of a MIMO or beamforming radio device for wireless communication and radar sensing according to an example embodiment of the present disclosure implementing analogue beamforming in the transmitter and receiver in both communication and sensing modes or digital beamforming in the receiver in communication mode. The parts of the MIMO radio device which are identical to those shown in FIG. 6A are denoted with identical reference signs. Differently from the beamforming radio device of FIG. 6A, the radio device of this figure comprises N identical receiver chains as shown in FIG. 3 with the combination and processing of the down-converted signals being done in the digital processor 400.

Figure 6C:
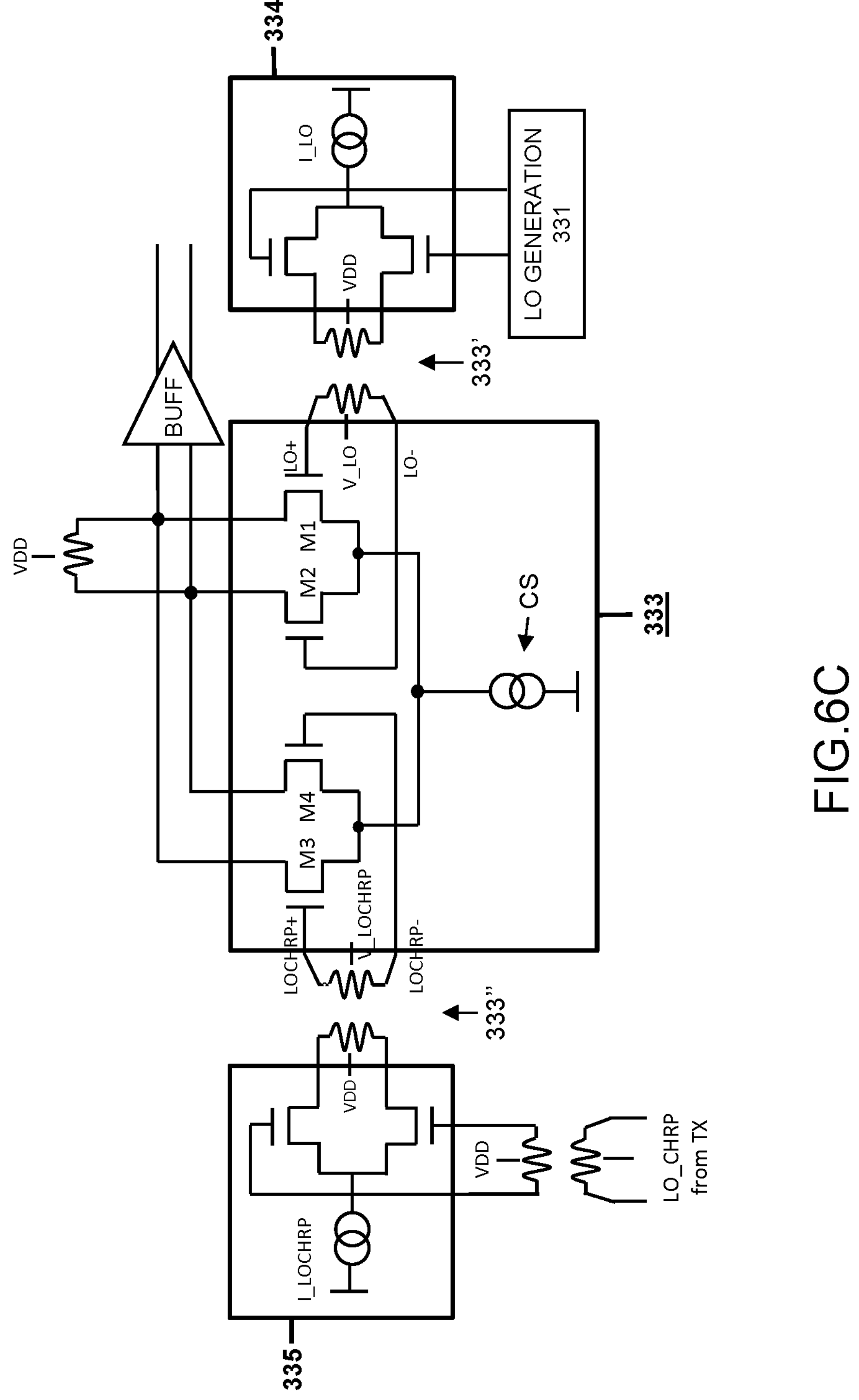
FIG. 6C shows an example implementation of the selector unit of the beamforming radio device for wireless communication and radar sensing of FIG. 6A and FIG. 6B, according to an example embodiment.

FIG. 6C shows an example implementation of the selector unit of the beamforming radio device of FIG. 6A and FIG. 6B. The circuit is the same as the one shown in FIG. 4A with the only difference that the transconductance stage, TC, of the respective mixers 322' and 322" is now replaced by a current source, CS. The electrical transformers 333' and 333" are controlled by controlling the V_LO and V_LO-CHRP in the same way as shown in the Table 1 above, i.e., in communication mode the first mixer 322' is operational thus feeding the LO signal to the respective mixers 322, and in sensing mode the second mixer 322" is operational thus feeding a copy of the transmitted signal, LOCHRP, to the respective mixers 322. Similarly, quadrature implementation is done by duplicating the circuitry in the same way as detailed above for FIG. 4A.

In summary, the proposed radio device for wireless communication and sensing accommodates reduced modifications in comparison to conventional wireless transceiver architectures. The radio devices described herein can include a digital processor configured to further perform generation of a digital FMCW waveform and radar processing of the de-chirped received signal, a selector unit for feeding the LO signal in communication mode or the chirp signal in sensing mode, a programmable integrator section switchably connectable to the receiver's LPF for implementing a HPF in sensing mode, and optionally an I/Q re-generator to provide a quadrature implementation. The performance of the radio devices described herein in both modes of operations is not compromised. Additionally, since the radio devices described herein support wideband communication such as OFDM and variants of PSK and QAM modulations schemes, the ranging resolution in sensing mode is not impacted.

Although the subject matter of the present disclosure has been illustrated by reference to specific embodiments, it will be apparent to those skilled in the art that the present disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the present disclosure being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the present disclosure are capable of operating according to the present disclosure in other sequences, or in orientations different from the one(s) described or illustrated above.

While various embodiments of the present disclosure have been described above, it should be understood that they have been presented by way of example only, and not limitation. Numerous changes to the disclosed embodiments can be made in accordance with the disclosure herein without departing from the spirit or scope of the present disclosure. Thus, the breadth and scope of the present disclosure should not be limited by any of the above described embodiments.

Although the embodiments described herein have been illustrated and described with respect to one or more implementations, equivalent alterations and modifications will occur to others skilled in the art upon the reading and understanding of this specification and the annexed drawings. In addition, while a particular feature of the present disclosure may have been disclosed with respect to only one of several implementations, such feature may be combined with one or more other features of the other implementations as may be desired for any given or particular application.

What is claimed is:

1. A radio device for wireless communication and radar sensing, the radio device comprising:

a transmitter configured to generate a modulated RF signal and to transmit the modulated RF signal via a transmitting antenna; and a receiver configured to receive a modulated RF signal via a receiving antenna and to down-convert the received modulated RF signal;

wherein the radio device further comprises a selector unit configured to controllably switch between providing the receiver with (i) a copy of the transmit modulated RF signal and (ii) a local oscillator signal (LO) to down-convert the received modulated RF signal.

2. The radio device of claim 1, wherein the radio device further comprises an LO signal generator configured to generate the LO signal.

3. The radio device of claim 1, wherein the receiver further comprises a switchably connectable high-pass filter configured to suppress transmitter spill-over.

4. The radio device of claim 3, wherein the switchably connectable high-pass filter comprises a first low pass filter section and a second switchably connectable low-pass filter section that provide a high-pass filtering when connected together.

5. The radio device of claim 4, wherein the second switchably connectable low-pass filter section is programmable.

6. The radio device of claim 4, wherein the first low-pass filter section is programmable.

7. The radio device of claim 1, further comprising a digital processor configured to generate a digital FMCW waveform and digital communication symbols and to extract communication symbols and range and Doppler information.

8. The radio device of claim 1, wherein the receiver comprises a mixer unit that comprises a first mixer and a second mixer connected in parallel, wherein the first mixer is configured to provide a baseband signal at its output by down-converting the modulated RF signal being fed into a first input of the first mixer using the LO signal being fed into a second input of the first mixer, and wherein the second mixer is configured to provide a beat signal at its output by down-converting the modulated RF signal being fed into a first input of the second mixer using the copy of the transmit modulated RF signal being fed into a second input of the second mixer.

9. The radio device of claim 8, wherein the first mixer and the second mixer receive, via respective electrical transformers, the LO signal and the copy of the transmitted modulated RF signal, respectively.

10. The radio device of claim 1, wherein the selector unit comprises a first mixer and a second mixer connected in parallel, wherein the first mixer is configured to provide the LO signal being fed into its input to its output, and wherein the second mixer is configured to provide the copy of the transmit modulated RF signal being fed into its input to its output.

11. The radio device of claim 10, further comprising electrical transformers coupled to the selector unit and configured to feed the LO signal and the copy of the transmitted modulated RF signal to the first mixer and to the second mixer, respectively.

12. The radio device of claim 11, wherein the electrical transformers are controllable to cause the first mixer to be operational when the radio device is performing wireless communication and to cause the second mixer to be operational when the radio device is performing radar sensing.

13. The radio device of claim 1, wherein the transmit modulated RF signal is at least one of a single-carrier signal, an OFDM signal, or an FMCW signal.

14. The radio device of claim 10, wherein the radio device is a beamforming radio device, wherein the beamforming radio device is configured to receive a plurality of modulated RF signals, and wherein the beamforming radio device comprises a signal splitter that controllably provides the receiver with one or the other of (i) a plurality of copies of the transmit modulated RF signal or (ii) a plurality of local oscillator signals to down-convert the respective modulated RF signals.

15. The radio device according of claim 10, wherein the radio device is a multiple-input and multiple-output (MIMO) radio device, wherein the MIMO radio device is configured to receive a plurality of modulated RF signals, and wherein the MIMO radio device comprises a signal splitter that controllably provides the receiver with one or the other of (i) a plurality of copies of the transmit modulated RF signal or (ii) a plurality of local oscillator signals to down-convert the respective modulated RF signals.

16. The radio device of claim 9, wherein the electrical transformers are controllable to cause the first mixer to be operational when the radio device is performing wireless communication and to cause the second mixer to be operational when the radio device is performing radar sensing.

17. A multiple-input and multiple-output (MIMO) radio device for wireless communication and radar sensing, the MIMO radio device comprising:

a transmitter configured to generate a modulated RF signal and to transmit the modulated RF signal via a transmitting antenna; and a receiver configured to receive a plurality of modulated RF signals via a plurality of receiving antennas and to down-convert the received modulated RF signals;

wherein the radio device further comprises a selector unit and signal splitter configured to controllably switch between providing the plurality of receivers with (i) a copy of the transmit modulated RF signal and (ii) a local oscillator signal (LO) to down-convert the received modulated RF signals.

18. The MIMO radio device of claim 17, wherein the selector unit comprises a first mixer and a second mixer connected in parallel, wherein the first mixer is configured to provide the LO signal being fed into its input to its output, and wherein the second mixer is configured to provide the copy of the transmit modulated RF signal being fed into its input to its output.

19. A beamforming radio device for wireless communication and radar sensing, the beamforming radio device comprising:

a transmitter configured to generate a modulated RF signal and to transmit the modulated RF signal via a transmitting antenna; and a receiver configured to receive a plurality of modulated RF signals via a plurality of receiving antennas and to down-convert the received modulated RF signals;

wherein the radio device further comprises a selector unit and signal splitter configured to controllably switch between providing the plurality of receivers with (i) a copy of the transmit modulated RF signal and (ii) a local oscillator signal (LO) to down-convert the received modulated RF signals.

20. The beamforming radio device of claim 19, wherein the selector unit comprises a first mixer and a second mixer connected in parallel, wherein the first mixer is configured to provide the LO signal being fed into its input to its output, and wherein the second mixer is configured to provide the copy of the transmit modulated RF signal being fed into its input to its output.

* * * * *